United States Patent
Yoshimura et al.

(10) Patent No.: US 12,377,998 B2
(45) Date of Patent: Aug. 5, 2025

(54) POWER SUPPLY SYSTEM OF VERTICAL TAKE-OFF AND LANDING AIRCRAFT

(71) Applicant: HONDA MOTOR CO., LTD., Tokyo (JP)

(72) Inventors: Kaisaku Yoshimura, Wako (JP); Bon Aizawa, Wako (JP); Kenta Uchida, Wako (JP); Masashi Kato, Wako (JP); Toshinori Tsukamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 18/361,107

(22) Filed: Jul. 28, 2023

(65) Prior Publication Data

US 2024/0043130 A1 Feb. 8, 2024

(30) Foreign Application Priority Data

Aug. 2, 2022 (JP) ................. 2022-123032

(51) Int. Cl.
- *B64D 31/00* (2024.01)
- *B60L 3/04* (2006.01)
- *B60L 3/12* (2006.01)
- *B60L 15/02* (2006.01)
- *B60L 50/00* (2019.01)
- *B64C 29/00* (2006.01)

(52) U.S. Cl.
CPC ............. *B64D 31/00* (2013.01); *B60L 3/04* (2013.01); *B60L 3/12* (2013.01); *B60L 15/025* (2013.01); *B60L 50/00* (2019.02); *B60L 2200/10* (2013.01); *B64C 29/0008* (2013.01)

(58) Field of Classification Search
None
See application file for complete search history.

(56) References Cited

U.S. PATENT DOCUMENTS

| | | | | |
|---|---|---|---|---|
| 8,195,374 | B2 * | 6/2012 | Suzuki | B60L 3/06 |
| | | | | 318/434 |
| 2014/0318907 | A1 | 10/2014 | Long | |
| 2016/0375892 | A1 * | 12/2016 | Kim | B60K 6/442 |
| | | | | 701/22 |
| 2020/0274368 | A1 * | 8/2020 | Crouse, Jr. | B64U 50/19 |
| 2022/0055761 | A1 * | 2/2022 | Kamio | B64D 27/357 |
| 2023/0312119 | A1 * | 10/2023 | Eto | B64D 27/33 |
| | | | | 701/16 |

FOREIGN PATENT DOCUMENTS

| | | | |
|---|---|---|---|
| JP | 2015-147574 A | 8/2015 | |
| WO | WO-2023052206 A1 * | 4/2023 | B63H 21/17 |

* cited by examiner

*Primary Examiner* — Daniel L Greene
(74) *Attorney, Agent, or Firm* — Rankin, Hill & Clark LLP

(57) ABSTRACT

A controller (a control unit) of a power supply system of a vertical take-off and landing aircraft is configured to: after lift is generated by wings (a front wing and a rear wing), perform stop control of controlling electric power supplied to a motor so that rotation of a VTOL rotor continues to stop; temporarily cancel the stop control in response to the temperature of any one switching element detected by a temperature detection unit (a temperature sensor) becoming equal to or higher than a temperature threshold during the stop control; and resume the stop control after the stop control has been temporarily canceled.

7 Claims, 7 Drawing Sheets

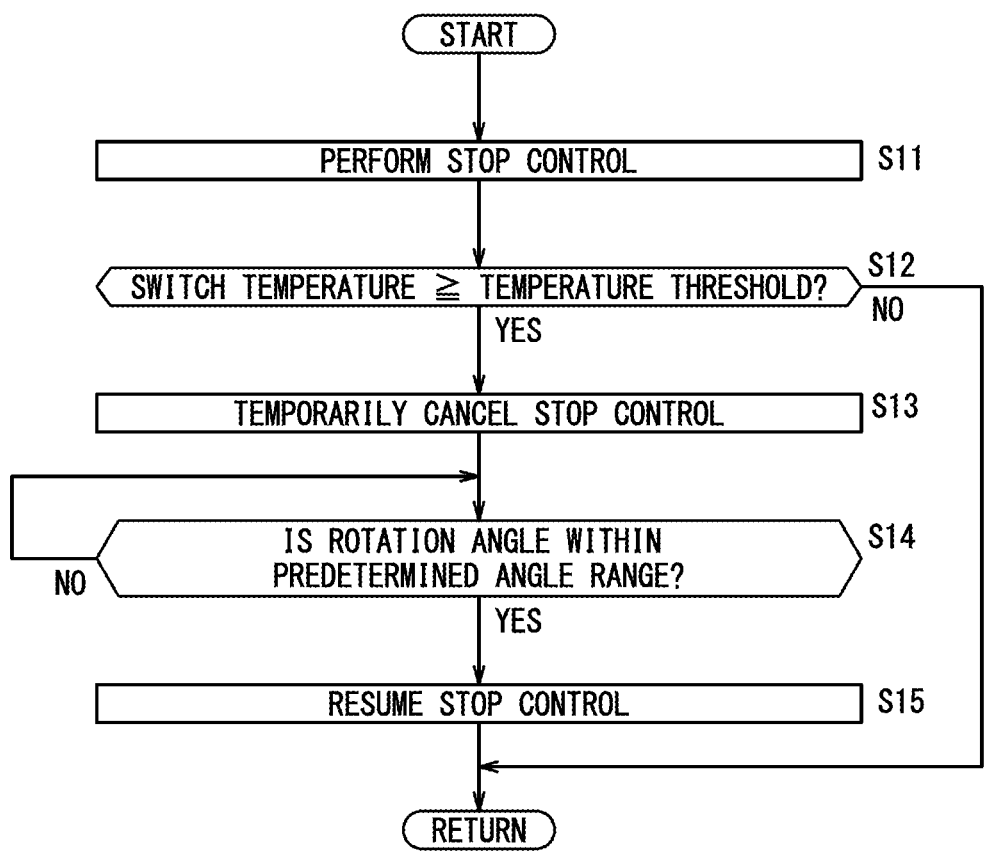

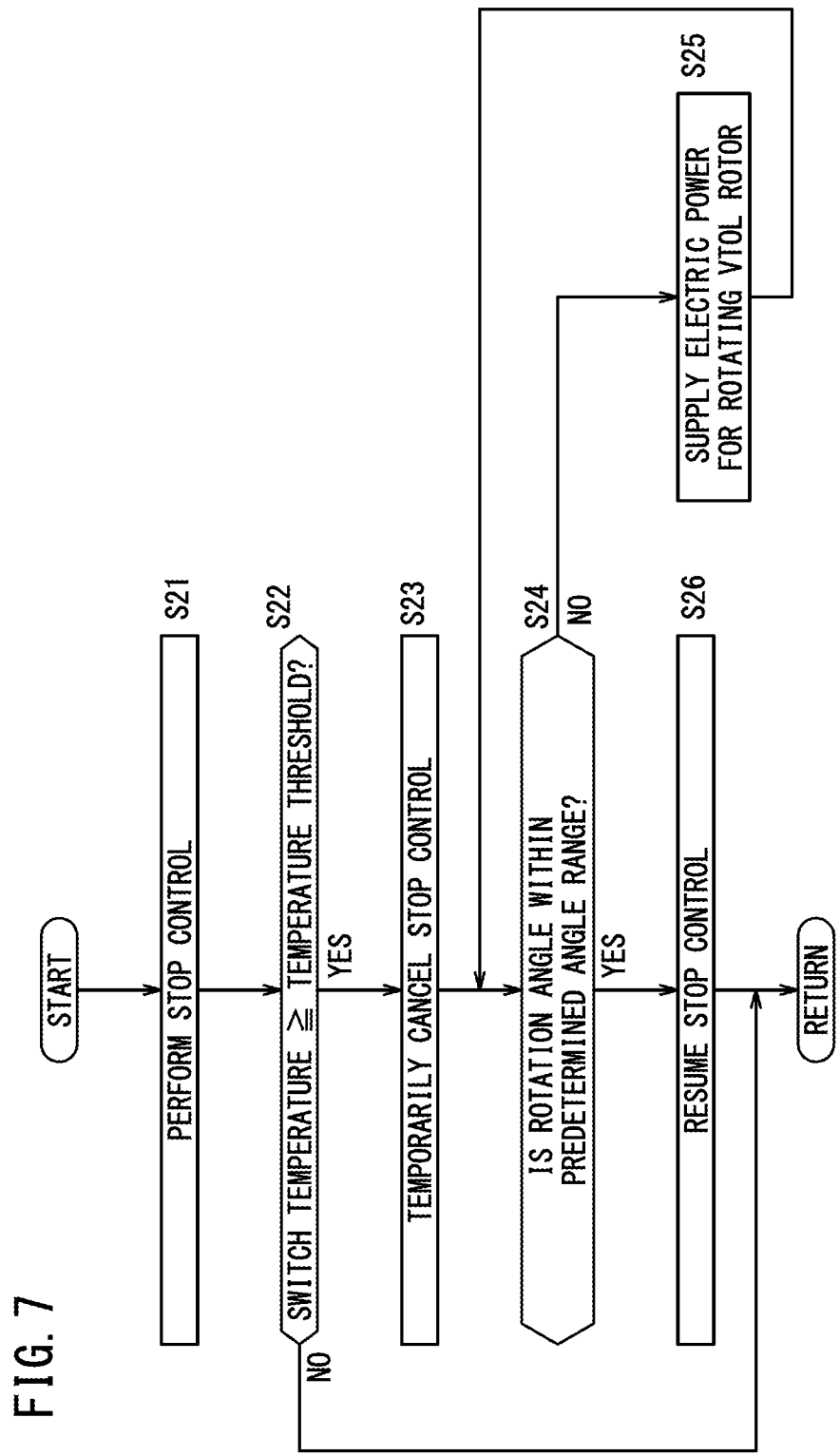

POWER SUPPLY SYSTEM OF VERTICAL TAKE-OFF AND LANDING AIRCRAFT

CROSS-REFERENCE TO RELATED APPLICATIONS

This application is based upon and claims the benefit of priority from Japanese Patent Application No. 2022-123032 filed on Aug. 2, 2022, the contents of which are incorporated herein by reference.

BACKGROUND OF THE INVENTION

Field of the Invention

The present invention relates to a power supply system of a vertical take-off and landing aircraft including VTOL rotors.

Description of the Related Art

Recently, vertical take-off and landing aircraft, so-called VTOL aircraft, have been developed. Some types of VTOL aircraft include a plurality of VTOL rotors and one or more cruise rotors. The VTOL rotors generate thrust in the vertical direction. The VTOL rotors are mainly used during takeoff and landing of the VTOL aircraft. The cruise rotors generate thrust in the horizontal direction. The cruise rotors are mainly used during cruising of the VTOL aircraft.

Blades of each VTOL rotor experience air resistance while the VTOL aircraft is cruising. That is, the VTOL rotor generates drag while the VTOL aircraft is cruising. While the VTOL aircraft is cruising, it is preferable to reduce drag caused by the VTOL rotors. JP 2015-147574 A discloses a technique for reducing drag by stopping rotation of each VTOL rotor while the VTOL aircraft is cruising. According to this technique, the rotation of the VTOL rotors is stopped by a mechanical stop mechanism. However, the mechanical stop mechanism increases the weight of the VTOL aircraft.

SUMMARY OF THE INVENTION

It is also possible to stop the rotation of the VTOL rotors by power control performed by a controller. Each VTOL rotor is connected to a rotation shaft of a motor. An inverter device is interposed between the motor and a power source. The controller can stop the rotation of each VTOL rotor by controlling electric power supplied to the motor by controlling the switching elements of the inverter device. According to this technique, the weight of the VTOL aircraft does not increase. On the other hand, according to this technique, since electric power is concentrated on a part of the switching elements, those switching elements generate heat. This may cause damage to the switching elements. Alternatively, the life of the switching elements may be shortened.

An object of the present invention is to solve the above-mentioned problems.

According to an aspect of the present invention, there is provided a power supply system of a vertical take-off and landing aircraft, the power supply system comprising: a vertical take-off and landing rotor configured to generate thrust in a vertical direction; a motor configured to rotate the vertical take-off and landing rotor; a power source; an inverter device configured to supply electric power from the power source to the motor using a plurality of switching elements, the electric power being multi-phase alternating current electric power; a controller configured to control the electric power supplied to the motor by controlling the plurality of switching elements; and a temperature detection unit configured to detect a temperature of each of the switching elements, wherein the controller is configured to: after lift is generated by a wing, perform stop control of controlling the electric power supplied to the motor in a manner so that rotation of the vertical take-off and landing rotor continues to stop; temporarily cancel the stop control in response to the temperature of any one of the switching elements detected by the temperature detection unit becoming equal to or higher than a temperature threshold during the stop control; and resume the stop control after the stop control has been temporarily canceled.

According to the present invention, it is possible to avoid various problems caused by heat, such as shortening of the life of the switching element and damage thereof, and as a result, it is possible to realize or maintain the stop control.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a flowchart of a stop process according to a second embodiment; and

FIG. 7 is a flowchart of a stop process according to a third embodiment.

DETAILED DESCRIPTION OF THE INVENTION

1. Configuration of Vertical Take-Off and Landing Aircraft 10

Figure 1:
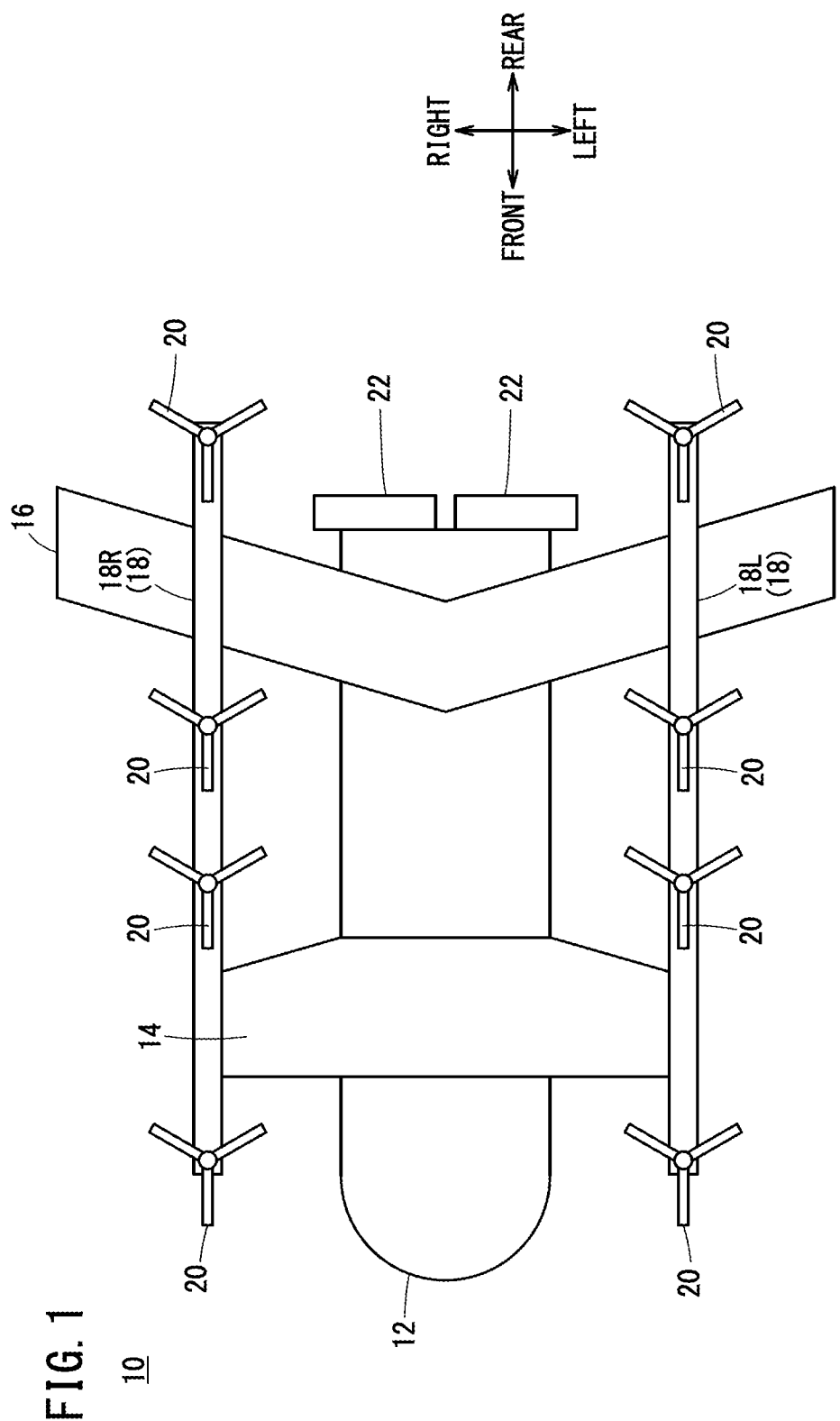
FIG. 1 is a top view of a vertical take-off and landing aircraft.

FIG. 1 is a top view of a vertical take-off and landing aircraft 10. Hereinafter, the vertical take-off and landing aircraft 10 is also referred to as a VTOL aircraft 10. The VTOL aircraft 10 is, for example, an electric vertical take-off and landing aircraft, a so-called eVTOL aircraft. The VTOL aircraft 10 includes a fuselage 12, a front wing 14, a rear wing 16, two booms 18, eight VTOL rotors 20, and two cruise rotors 22.

The VTOL aircraft 10 shown in FIG. 1 is an example of an aircraft that employs the present invention. The present invention is applicable to any aircraft in which the plurality of VTOL rotors 20 are stopped in a state in which lift is generated by a fixed wing as the aircraft moves forward.

The front wing 14 is connected to a front portion of the fuselage 12. The rear wing 16 is connected to a rear portion of the fuselage 12. The front wing 14 and the rear wing 16 generate lift as the VTOL aircraft 10 moves forward.

A boom 18R of the two booms 18 is disposed on the right side of the fuselage 12. A boom 18L of the two booms 18 is disposed on the left side of the fuselage 12. Each boom 18 extends in the front-rear direction.

Four motors 40 (FIG. 2) are arranged on the boom 18L sequentially toward the rear. Similarly, four motors 40 are arranged on the boom 18R sequentially toward the rear. The rotation shaft of each motor 40 is connected to the VTOL rotor 20 corresponding to the motor 40. One or more gears may be interposed between the rotation shaft of the motor 40 and the VTOL rotor 20. The axis of each VTOL rotor 20 is substantially parallel to the vertical direction. Alternatively, the axis of each VTOL rotor 20 may be inclined at a predetermined angle with respect to the vertical direction. The rotation of each VTOL rotor 20 is controlled so that the VTOL rotor 20 generates thrust in the vertical direction during vertical takeoff, during transition from takeoff and climb to cruising, during transition from cruising to descent and landing, during vertical landing, and during hovering. Each VTOL rotor 20 generates thrust in the vertical direction by rotation of the propeller.

Two motors 40 (FIG. 2) are disposed in the fuselage 12 so as to be arranged side by side in the left-right direction. The rotation shaft of each motor 40 is connected to the cruise rotor 22 corresponding to the motor 40. A plurality of gears may be interposed between the rotation shaft of the motor 40 and the cruise rotor 22. The axis of each cruise rotor 22 is substantially parallel to the horizontal direction. The rotation of each cruise rotor 22 is controlled so that the cruise rotor 22 generates thrust in the horizontal direction during cruising, during transition from takeoff and climb to cruising, and during transition from cruising to descent and landing. Each cruise rotor 22 generates thrust in the horizontal direction by rotation of the propeller.

2. Configuration of Power Supply System 30

Figure 2:
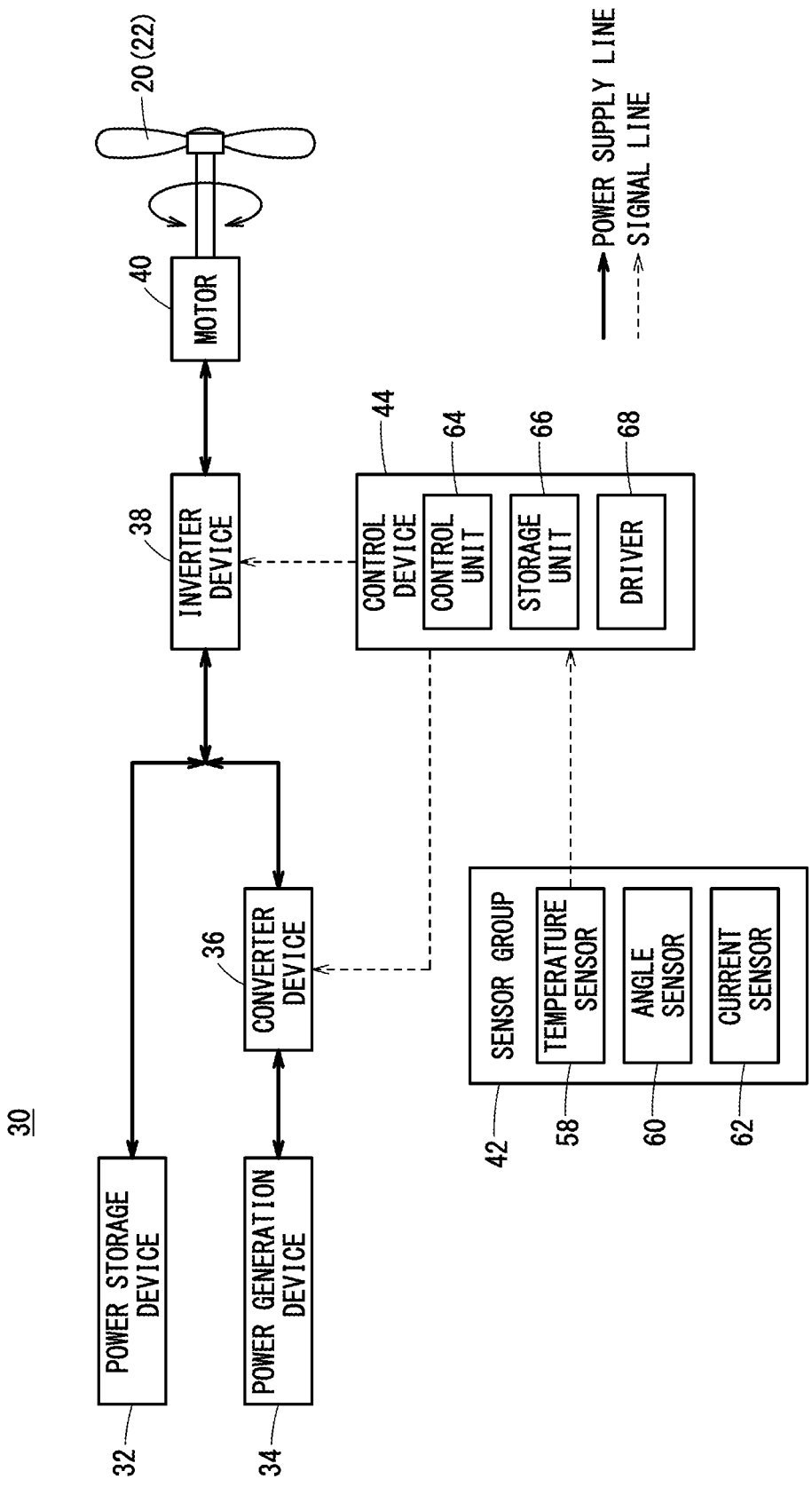
FIG. 2 is a block diagram of a power supply system of the vertical take-off and landing aircraft.

The VTOL aircraft 10 includes a power supply system 30 shown in FIG. 2. FIG. 2 is a block diagram of the power supply system 30 of the vertical take-off and landing aircraft 10. The power supply system 30 includes a power storage device 32, a power generation device 34, a converter device 36, an inverter device 38, the motor 40, a sensor group 42, and a control device 44. In FIG. 2, solid arrows indicate power supply lines, and broken lines indicate signal lines. Although the power supply system 30 including the power generation device 34 is described in the present specification, the power supply system 30 may not include the power generation device 34.

One inverter device 38 and one motor 40 are provided for one rotor (the VTOL rotor 20 or the cruise rotor 22). On the other hand, one power storage device 32, one power generation device 34, and one converter device 36 are provided for the plurality of rotors (the VTOL rotors 20 or the cruise rotors 22). In other words, the power storage device 32, the power generation device 34, and the converter device 36 are shared by a plurality of the power supply systems 30. For example, the same power storage device 32 may be provided for a pair of VTOL rotors 20 whose torques cancel each other out.

The power storage device 32 includes, for example, a high-voltage battery. The power generation device 34 includes a generator. The rotation shaft of the generator is connected to, for example, the rotation shaft of a gas turbine engine. The converter device 36 includes a converter circuit. One converter device 36 is provided for one power generation device 34. The primary terminal of the converter circuit is connected to the power generation device 34. The secondary terminal of the converter circuit is connected to the power storage device 32 and the inverter device 38. The converter device 36 can convert AC power output from the power generation device 34 into DC power, and output the DC power to the power storage device 32 and the inverter device 38. In addition, the converter device 36 can transform the voltage of electric power output from the power generation device 34, and output the transformed voltage to the power storage device 32 and the inverter device 38.

The inverter device 38 includes, for example, a three-phase inverter circuit. The inverter circuit includes a plurality of switching elements. The primary terminal of the inverter circuit is connected to the power storage device 32 and the converter device 36. The secondary terminal of the inverter circuit is connected to the motor 40. The inverter device 38 can convert DC power output from at least one of the power storage device 32 or the converter device 36 into AC power, and output the AC power to the motor 40.

The motor 40 is, for example, a three-phase motor. As described above, the rotation shaft of the motor 40 is connected to a hub of one rotor (the VTOL rotor 20 or the cruise rotor 22) directly or via one or more gears.

The sensor group 42 includes sensors included in the VTOL aircraft 10. For example, the sensor group 42 includes a plurality of temperature sensors 58, one angle sensor 60, and a plurality of current sensors 62. One temperature sensor 58 is provided for one switching element of the inverter device 38. The temperature sensor 58 detects the temperature of the switching element (switch temperature). Instead of the temperature sensor 58, a control unit 64 described later may estimate each switch temperature based on a current value or the like. The angle sensor 60 detects a rotation angle of each VTOL rotor 20. Each current sensor 62 detects one phase current supplied to the motor 40. Each sensor outputs a signal indicating the detected information to the control device 44.

The control device 44 controls the power supply system 30. The control device 44 may be, for example, a flight controller of the VTOL aircraft 10 or a slave controller controlled by the flight controller. The control device 44 includes a control unit 64, a storage unit 66, and a driver 68.

The control unit 64 includes processing circuitry. The processing circuitry may be a processor such as a CPU. The processing circuitry may be an integrated circuit such as an ASIC or an FPGA. The processor can execute various processes by executing programs stored in the storage unit 66. At least some of the plurality of processes may be executed by an electronic circuit including a discrete device.

The control unit 64 outputs a control signal to the driver 68 in order to control each motor 40. As a result, the control unit 64 can supply electric power to each motor 40 and can stop the supply of electric power to each motor 40. The control unit 64 can stop the rotation of each VTOL rotor 20 by controlling the inverter device 38. The control of the inverter device 38 performed by the control unit 64 in order to stop the rotation of each VTOL rotor 20 is referred to as stop control. Further, the control unit 64 may fix the rotation angle of each VTOL rotor 20 at a predetermined angle.

Furthermore, the control unit 64 can change the torque of the motor 40 by controlling the inverter device 38.

The storage unit 66 includes a volatile memory and a non-volatile memory. Examples of the volatile memory include a RAM and the like. The volatile memory is used as a working memory of the processor. The volatile memory temporarily stores data and the like necessary for processing or computation. Examples of the non-volatile memory include a ROM, a flash memory, and the like. The non-volatile memory is used as a storage memory. The non-volatile memory stores programs, tables, maps, and the like. At least a part of the storage unit 66 may be included in the processor, the integrated circuit, or the like as described above.

The non-volatile memory stores the relationship between the amount of change in the rotation angle of the VTOL rotor 20 and the amount of change in the electrical angle of the motor 40. The amount of change in the rotation angle of the VTOL rotor 20 and the amount of change in the electrical angle of the motor 40 are determined according to the number of magnetic poles of the motor 40. When a gear is interposed between the VTOL rotor 20 and the motor 40, the amount of change in the rotation angle of the VTOL rotor 20 and the amount of change in the electrical angle of the motor 40 are determined according to the gear ratio.

The driver 68 includes a gate driver circuit. In response to the control signal output from the control unit 64, the driver 68 outputs an ON/OFF signal to each switching element included in the inverter circuit of the inverter device 38. Further, in a case where the converter device 36 includes switching elements, the driver 68 outputs an ON/OFF signal to each switching element of the converter device 36.

3. State of Blade 70 in Stop Control

Figure 3:
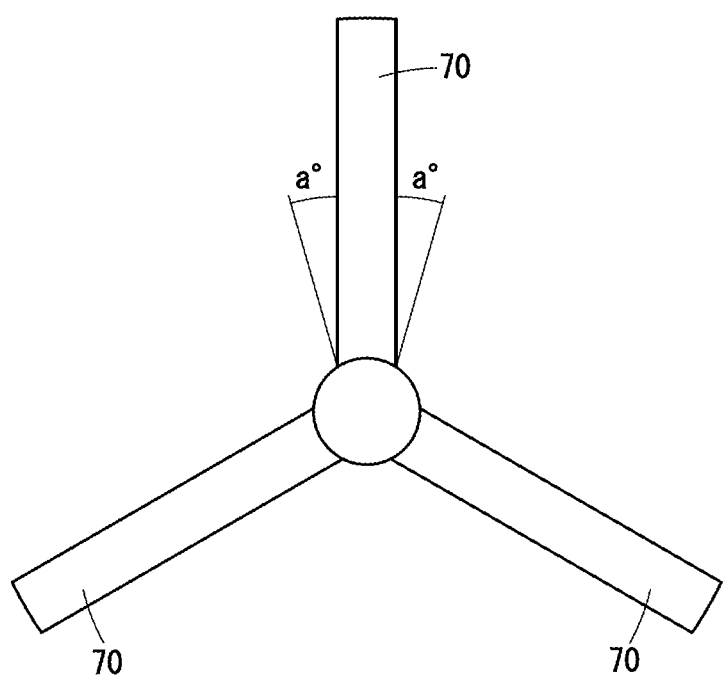
FIG. 3 is a top view of a stopped VTOL rotor.
Figure 3:
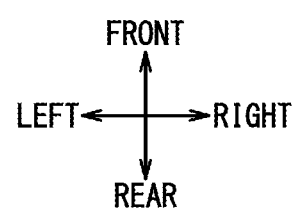

FIG. 3 is a top view of a stopped VTOL rotor 20. As shown in FIG. 3, the control unit 64 stops the VTOL rotor 20 with one blade 70 extending generally straight forward. The air resistance experienced by the blade 70 varies depending on the shape, size, and the like of the blade 70. In the present specification, it is assumed that the attitude shown in FIG. 3 minimizes the total air resistance experienced by the blades 70. That is, the attitude shown in FIG. 3 can minimize drag caused by the VTOL rotor 20.

Note that FIG. 3 illustrates the VTOL rotor 20 including three blades 70. However, the number of the blades 70 is not limited. Regardless of the number of the blades 70, by stopping the VTOL rotor 20 with one blade 70 extending generally straight forward, drag caused by the VTOL rotor 20 can be minimized. If the angle of the blade 70 with respect to the front-rear direction is within $0°±a°$, the drag can be minimized. The angle $a°$ is determined according to the shape and the like of the blade 70. In the present specification, the angle range of $0°±a°$ is referred to as a "stop angle range".

The storage unit 66 stores, as a predetermined angle range, the rotation angle range of the VTOL rotor 20 in which the angle of the blade 70 is within the stop angle range. It is preferable that the control unit 64 fixes the rotation angle of the VTOL rotor 20 within the predetermined angle range in the cruising state of the VTOL aircraft 10.

4. Stop Process Performed by Control Unit 64

4-1. First Embodiment

Figure 4:
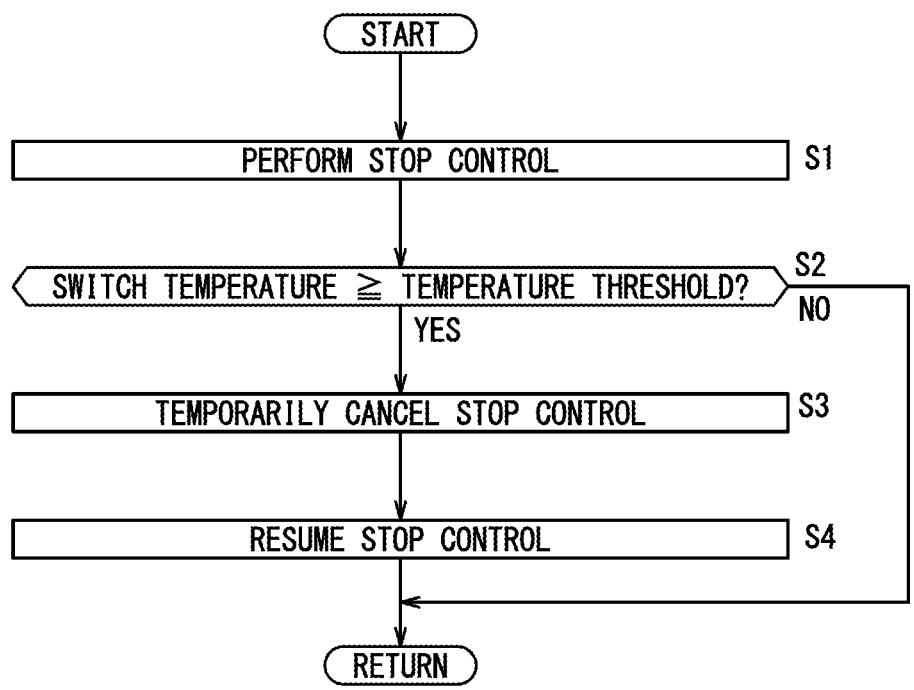
FIG. 4 is a flowchart of a stop process according to a first embodiment.

FIG. 4 is a flowchart of a stop process according to a first embodiment. The control unit 64 executes the process shown in FIG. 4 at predetermined time intervals after the VTOL aircraft 10 transitions from takeoff to cruising. For example, in a state where the VTOL aircraft 10 is moving forward at or above a predetermined speed, the wings (the front wing 14 and the rear wing 16) generate sufficient lift. Therefore, after operating the cruise rotors 22, the control unit 64 may stop the rotation of each VTOL rotor 20 in response to the forward speed becoming equal to or higher than the predetermined speed.

In step S1, the control unit 64 performs stop control. Here, the control unit 64 controls the inverter device 38 to stop each VTOL rotor 20 and supplies electric power to the motor 40. The power storage device 32 or the power generation device 34 supplies appropriate electric power to the inverter device 38. The inverter device 38 supplies electric power to the motor 40 through the switching elements that are turned on. As a result, the motor 40 and the VTOL rotor 20 can remain in a stopped state. When the process of step S1 is ended, the process proceeds to step S2.

In step S2, the control unit 64 compares the switch temperature detected by each temperature sensor 58 with a temperature threshold. The temperature threshold is stored in advance in the storage unit 66. If any one of the switch temperatures is equal to or higher than the temperature threshold (step S2: YES), the process proceeds to step S3. On the other hand, when all of the switch temperatures are lower than the temperature threshold (step S2: NO), the stop process at this timing is ended. In this case, the control unit 64 continues the stop control. As a result, the motor 40 and the VTOL rotor 20 remain in a stopped state.

When the process proceeds from step S2 to step S3, the control unit 64 temporarily cancels the stop control. For example, the control unit 64 turns off each switching element of the inverter device 38 to temporarily stop the power supply to the motor 40. The time during which the power supply is stopped can be arbitrarily set. The control unit 64 may reduce the torque of the motor 40 instead of stopping the power supply. When the process of step S3 is ended, the process proceeds to step S4.

In step S4, the control unit 64 resumes the stop control. When the power supply is stopped in step S3, the control unit 64 resumes the power supply to the motor 40 to stop the VTOL rotor 20. When the torque is reduced in step S3, the control unit 64 increases the torque. When the process of step S4 is ended, the stop process is tentatively ended.

Figure 5A:
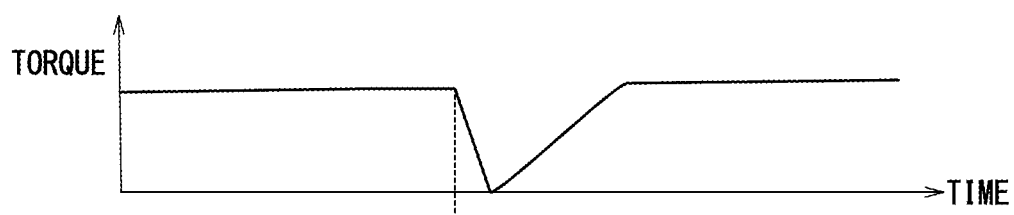
FIG. 5A is a graph illustrating a temporal change in the torque generated in a VTOL rotor by a motor.
Figure 5B:
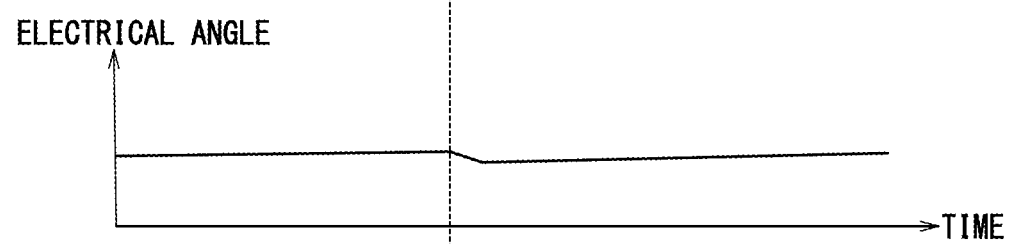
FIG. 5B is a graph illustrating a temporal change in the electrical angle of the motor.
Figure 5C:
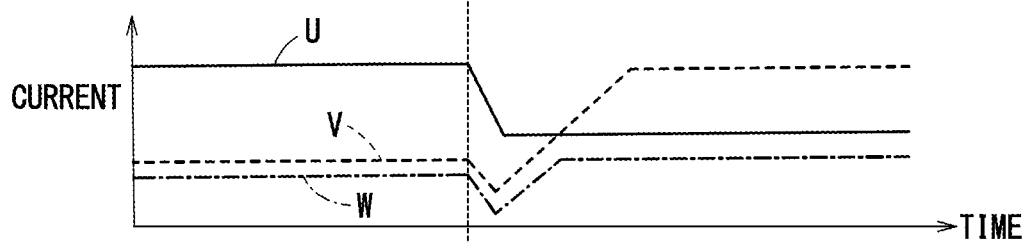
FIG. 5C is a graph illustrating temporal changes in three phase (U-phase, V-phase, and W-phase) currents flowing through the motor.
Figure 5D:
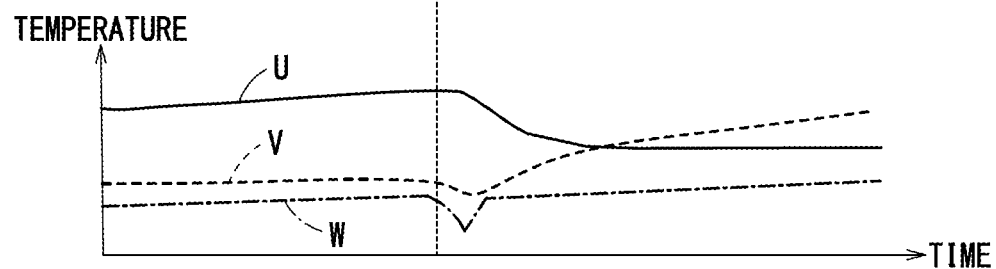
FIG. 5D is a graph illustrating a temporal change in temperature of switching elements through which three phase (U-phase, V-phase, and W-phase) currents flowing through the motor flow.

As shown in FIG. 5A, the torque of the motor 40 is temporarily reduced by the temporary cancellation of the stop control, and is restored by the resumption of the stop control. As shown in FIG. 5B, the electrical angle (the phase of the current of the motor 40) is changed by the temporary cancellation and the resumption of the stop control. As shown in FIG. 5C, the current value of each of three phase (U-phase, V-phase, and W-phase) currents is changed by the temporary cancellation and the resumption of the stop control. As shown in FIG. 5D, the temperature of the switching element having the highest temperature among the switching elements through which the three phase (U-phase, V-phase, and W-phase) currents flow decreases after the temporary cancellation of the stop control.

Note that, in FIG. 5A, the torque of the motor 40 becomes 0 due to the temporary cancellation of the stop control. However, the control unit 64 may not set the torque of the motor 40 to 0. For example, the control unit 64 may control the motor 40 so that the torque of the motor 40 is smaller than the external force acting on the propeller of the VTOL rotor 20.

In the first embodiment, when the temperature of one of the switching elements of the inverter device 38 becomes equal to or higher than the temperature threshold, the process of step S3 is performed. For example, the control unit 64 temporarily stops the power supply to the motor 40. As a result, the heated switching element is turned off. Then, the temperature of the switching element decreases. Alternatively, the control unit 64 reduces the torque of the motor 40. As a result, the phases of the three phase currents supplied to the motor 40 change. Then, the energization state of the heated switching element changes, and the temperature of the switching element decreases. Therefore, according to the first embodiment, it is possible to prevent the switching element from being damaged. According to the first embodiment, as a result, the life of the switching element can be extended.

4-2. Second Embodiment

FIG. 6 is a flowchart of a stop process according to a second embodiment. The second embodiment is an application example of the first embodiment. The processes of steps S11 to S13 and step S15 shown in FIG. 6 are the same as the processes of steps S1 to S4 shown in FIG. 4. Hereinafter, description of steps S11 to S13 and step S15 will be omitted, and step S14 will be described.

In step S13, the power supply to the motor 40 is stopped. Thus, there is no torque applied to the VTOL rotor 20 by the motor 40. In this state, the VTOL rotor 20 can be rotated by an external force.

In step S14, the control unit 64 determines whether or not the rotation angle of the VTOL rotor 20 detected by the angle sensor 60 is within the predetermined angle range. As described above, the predetermined angle range is stored in advance in the storage unit 66. When the rotation angle of the VTOL rotor 20 is within the predetermined angle range (step S14: YES), the process proceeds to step S15. In this case, the control unit 64 resumes the stop control. On the other hand, when the rotation angle of the VTOL rotor 20 is not within the predetermined angle range (step S14: NO), the control unit 64 continues the determination of step S14.

In step S14, the control unit 64 may gradually increase the torque of the motor 40 at the time when the rotation angle of the VTOL rotor 20 falls within a range of the stop angle range±b°.

According to the second embodiment, in the same manner as in the first embodiment, it is possible to prevent the switching element from being damaged. According to the second embodiment, as a result, the life of the switching element can be extended. Further, according to the second embodiment, any one of the blades 70 of the VTOL rotor 20 can be reliably stopped within the stop angle range.

4-3. Third Embodiment

FIG. 7 is a flowchart of a stop process according to a third embodiment. The third embodiment is an application example of the second embodiment. In the second embodiment described above, the external force causes the VTOL rotor 20 to rotate. In the third embodiment, the motor 40 rotates the VTOL rotor 20. The processes of steps S21 to S24 and step S26 shown in FIG. 7 are the same as the processes of steps S11 to S15 shown in FIG. 6. Hereinafter, description of steps S21 to S24 and step S26 will be omitted, and step S25 will be described.

In step S24, when the rotation angle of the VTOL rotor 20 is not within the predetermined angle range (step S24: NO), the process proceeds to step S25. In step S25, the control unit 64 supplies electric power to the motor 40 to rotate the VTOL rotor 20. The control unit 64 switches ON/OFF of each switching element of the inverter device 38 to supply electric power to the motor 40. The motor 40 rotates in response to the supply of electric power. The VTOL rotor 20 rotates in response to the rotation of the motor 40. The control unit 64 continuously performs the process of step S25 until the rotation angle of the VTOL rotor 20 falls within the predetermined angle range.

According to the third embodiment, in the same manner as in the first embodiment and the second embodiment, it is possible to prevent the switching element from being damaged. According to the third embodiment, as a result, the life of the switching element can be extended. Further, according to the third embodiment, any one of the blades 70 of the VTOL rotor 20 can be reliably stopped within the stop angle range. Further, according to the third embodiment, any one of the blades 70 of the VTOL rotor 20 can be rapidly rotationally moved to the stop angle range. As a result, drag can be minimized.

The control unit 64 may control the rotation direction of the VTOL rotor 20 in step S25. The motor 40 is rotatable in two directions, namely, a forward direction and a reverse direction. For example, the control unit 64 acquires the latest rotation angle of the VTOL rotor 20. The control unit 64 compares the angle difference between the latest rotation angle in the forward direction and the predetermined angle range, with the angle difference between the latest rotation angle in the reverse direction and the predetermined angle range. The control unit 64 selects the direction in which the angle difference is smaller, and rotates the motor 40 in this direction. As a result, any one of the blades 70 of the VTOL rotor 20 can be more rapidly rotationally moved to the stop angle range. As a result, drag can be minimized.

The third embodiment can be modified. In the above-described embodiment, the control unit 64 determines the rotation direction of the VTOL rotor 20 based on the rotation angle. Instead, the control unit 64 may determine the rotation direction of the VTOL rotor 20 based on the power consumption of the motor 40. For example, based on the current value detected by each current sensor 62, the control unit 64 calculates the power consumption when the VTOL rotor 20 is rotated in two directions. The control unit 64 may supply electric power to the motor 40 so as to rotate the VTOL rotor 20 in a rotation direction for making the power consumption of the motor 40 smaller.

5. Invention Obtained from Embodiments

The invention that can be grasped from the above embodiments will be described below.

According to the aspect of the present invention, provided is the power supply system (30) of the vertical take-off and landing aircraft (10), the power supply system including: the VTOL rotor (20) configured to generate thrust in the vertical direction; the motor (40) configured to rotate the VTOL rotor; the power source (32, 34); the inverter device (38) configured to supply electric power to the motor from the power source using the plurality of switching elements, the electric power being multi-phase AC electric power; the controller (64) configured to control the electric power supplied to the motor by controlling the plurality of switching elements; and the temperature detection unit (58) configured to detect the temperature of each of the switching elements, wherein the controller is configured to: after lift is generated by the wing (14, 16), perform stop control of controlling the electric power supplied to the motor in a manner so that rotation of the VTOL rotor continues to stop; temporarily cancel the stop control in response to the temperature of any one of the switching elements detected by the temperature detection unit becoming equal to or higher than the temperature threshold during the stop control; and resume the stop control after the stop control has been temporarily canceled.

In the above configuration, the stop control is temporarily canceled. By canceling the stop control, the temperature of the heated switching element decreases. Therefore, according to the above configuration, it is possible to prevent the switching element from being damaged. According to the above configuration, as a result, shortening of the life of the switching element due to heat generation can be avoided and the life thereof can be extended.

In the above aspect, the controller may temporarily cancel the stop control by temporarily stopping supply of the electric power to the motor.

According to the above configuration, by turning off the heated switching element, the temperature of the heated switching element decreases. Therefore, according to the above configuration, it is possible to prevent the switching element from being damaged. According to the above configuration, as a result, shortening of the life of the switching element due to heat generation can be avoided and the life thereof can be extended.

In the above aspect, the controller may temporarily cancel the stop control by making the torque of the motor smaller than the torque of the motor generated before the temperature of any one of the switching elements becomes equal to or higher than the temperature threshold.

According to the above configuration, by reducing the torque of the motor, the balance between the external force and the torque is lost. As a result, the motor rotates and the phase of the current supplied to the motor changes. Then, the temperature of the heated switching element decreases. Therefore, according to the above configuration, it is possible to prevent the switching element from being damaged. According to the above configuration, as a result, shortening of the life of the switching element due to heat generation can be avoided and the life thereof can be extended.

In the above aspect, the power supply system may further include the angle detection unit (60) configured to detect the rotation angle of the VTOL rotor, and the controller may resume the stop control in response to the rotation angle detected by the angle detection unit falling within the predetermined angle range after the stop control has been temporarily canceled.

According to the above configuration, it is possible to reliably stop any one of the blades of the VTOL rotor within the stop angle range.

In the above aspect, the power supply system may further include the angle detection unit configured to detect the rotation angle of the VTOL rotor, and after the stop control has been temporarily canceled, the controller may supply the electric power to the motor so as to rotate the VTOL rotor, and the controller may resume the stop control in response to the rotation angle detected by the angle detection unit falling within the predetermined angle range.

According to the above configuration, it is possible to reliably stop any one of the blades of the VTOL rotor within the stop angle range. Further, according to the above configuration, it is possible to rapidly rotationally move any one of the blades of the VTOL rotor to the stop angle range.

In the above aspect, the controller may supply the electric power to the motor so as to rotate the VTOL rotor in a rotation direction in which an angle between the latest rotation angle of the VTOL rotor and the predetermined angle range is smaller among the two rotation directions of the VTOL rotor.

According to the above configuration, it is possible to more rapidly rotationally move any one of the blades of the VTOL rotor to the stop angle range.

In the above aspect, the controller may supply the electric power to the motor so as to rotate the VTOL rotor in a rotation direction for making the power consumption of the motor smaller among the two rotation directions of the VTOL rotor.

Note that the present invention is not limited to the above disclosure, and various modifications are possible without departing from the essence and gist of the present invention.

The invention claimed is:

1. A power supply system of a vertical take-off and landing aircraft, the power supply system comprising:
   a vertical take-off and landing rotor configured to generate thrust in a vertical direction;
   a motor configured to rotate the vertical take-off and landing rotor;
   a power source;
   an inverter device configured to supply electric power from the power source to the motor using a plurality of switching elements, the electric power being multiphase alternating current electric power;
   a controller configured to control the electric power supplied to the motor by controlling the plurality of switching elements; and
   a temperature detection unit configured to detect a temperature of each of the switching elements,
   wherein the controller is configured to:
   after lift is generated by a wing, perform stop control of controlling the electric power supplied to the motor in a manner so that rotation of the vertical take-off and landing rotor continues to stop;
   temporarily cancel the stop control in response to the temperature of any one of the switching elements detected by the temperature detection unit becoming equal to or higher than a temperature threshold during the stop control; and
   resume the stop control after the stop control has been temporarily canceled.

2. The power supply system of the vertical take-off and landing aircraft according to claim 1, wherein
   the controller temporarily cancels the stop control by temporarily stopping supply of the electric power to the motor.

3. The power supply system of the vertical take-off and landing aircraft according to claim 1, wherein
   the controller temporarily cancels the stop control by making a torque of the motor smaller than the torque of the motor generated before the temperature of any one of the switching elements becomes equal to or higher than the temperature threshold.

4. The power supply system of the vertical take-off and landing aircraft according to claim 1, further comprising an angle detection unit configured to detect a rotation angle of the vertical take-off and landing rotor, wherein
   the controller resumes the stop control in response to the rotation angle detected by the angle detection unit falling within a predetermined angle range after the stop control has been temporarily canceled.

5. The power supply system of the vertical take-off and landing aircraft according to claim 1, further comprising an angle detection unit configured to detect a rotation angle of the vertical take-off and landing rotor, wherein after the stop control has been temporarily canceled, the controller supplies the electric power to the motor so as to rotate the vertical take-off and landing rotor, and the controller resumes the stop control in response to the rotation angle detected by the angle detection unit falling within a predetermined angle range.

6. The power supply system of the vertical take-off and landing aircraft according to claim 5, wherein the controller supplies the electric power to the motor so as to rotate the vertical take-off and landing rotor in a rotation direction in which an angle between a latest rotation angle of the vertical take-off and landing rotor and the predetermined angle range is smaller among two rotation directions of the vertical take-off and landing rotor.

7. The power supply system of the vertical take-off and landing aircraft according to claim 5, wherein the controller supplies the electric power to the motor so as to rotate the vertical take-off and landing rotor in a rotation direction for making power consumption of the motor smaller among two rotation directions of the vertical take-off and landing rotor.

* * * * *